March 29, 1955     F. W. ROSS     2,705,117
AIRPLANE CONTROL SYSTEM Filed Aug. 31, 1950     7 Sheets—Sheet 1

Fig. 1

INVENTOR
BY *Frederick W. Ross*
ATTORNEY

March 29, 1955  F. W. ROSS  2,705,117
AIRPLANE CONTROL SYSTEM
Filed Aug. 31, 1950  7 Sheets-Sheet 3

INVENTOR.
Frederick W. Ross
BY
ATTORNEY

March 29, 1955  F. W. ROSS  2,705,117
AIRPLANE CONTROL SYSTEM

Filed Aug. 31, 1950  7 Sheets-Sheet 4

INVENTOR
Frederick W. Ross
BY
ATTORNEY

March 29, 1955　　　　　F. W. ROSS　　　　　2,705,117
AIRPLANE CONTROL SYSTEM

Filed Aug. 31, 1950　　　　　　　　　　　　　7 Sheets-Sheet 5

INVENTOR
Frederick W. Ross
BY
ATTORNEY

March 29, 1955  F. W. ROSS  2,705,117
AIRPLANE CONTROL SYSTEM
Filed Aug. 31, 1950  7 Sheets-Sheet 6

INVENTOR
Frederick W. Ross
BY
ATTORNEY

March 29, 1955        F. W. ROSS        2,705,117

AIRPLANE CONTROL SYSTEM

Filed Aug. 31, 1950        7 Sheets-Sheet 7

INVENTOR
Frederick W. Ross
BY
ATTORNEY

United States Patent Office 2,705,117
Patented Mar. 29, 1955

2,705,117

AIRPLANE CONTROL SYSTEM

Frederick W. Ross, Dearborn, Mich.

Application August 31, 1950, Serial No. 182,597

12 Claims. (Cl. 244—83)

This invention relates to airplanes, and more particularly to aerodynamic control systems therefor, including roll, yaw, and pitch elements, having characteristics effective to reduce the complexities of the flight control technique required by a pilot without limitation of the amount of control available to the pilot, and means for increasing the performance of the airplane.

All airplanes, in order to be maneuvered while flying and during take-off and landing, have means to control the angular position of the airplane with respect to the surrounding air and the ground. Such means are known collectively in the art as the aerodynamic control system, and when used in conjunction with the engine controls provide means for guiding the airplane through all maneuvers.

The aerodynamic control system consists of three principal elements which are referred to by those skilled in the art as a roll element, such as ailerons, to control the roll angle of the airplane; a yaw element, such as a rudder, to control the yaw angle of the airplane; and a pitch element, such as elevators, to control the pitch angle or angle of attack of the wing of the airplane with respect to the flight path of the airplane through the oncoming air.

The roll, yaw, and pitch elements, in order to be actuated by the pilot are connected through proper means to the pilot's control levers. In control systems used prior to this invention these means for connecting the roll, yaw and pitch elements to the control levers have been of two general types, each requiring a particular technique on the part of the pilot for maneuvering the airplane.

The most commonly used arrangement of devices is that which is termed by those skilled in the art as "the conventional three-control system." For this type of system, each of the three elements, roll, yaw, and pitch, are connected to the control levers so that each can be actuated separately. In the second arrangement of such devices the roll element and the yaw element are interconnected so as to be operable in unison to provide turning control of the airplane by one manipulation of a single pilot's control lever; the pitch element is connected so as to be operable separately by a second manipulation of the pilot's control lever. This latter arrangement may be referred to as "an interconnected roll-yaw control system."

The manipulations which the pilot must use in order to maneuver the airplane with these two types of devices are respectively as follows:

With the conventional three-control system the pilot must use two quite opposite techniques in order to make full use of the controls. The first of these two techniques is used in the normal-flight speed range (well above the stall speed). The pilot must actuate both the roll and yaw control levers with the proper amount of deflection of each to provide the correct coordination of the roll and yaw element deflections necessary to give the airplane the correct bank and turn so that it will maneuver properly as desired. For making a true-banked turn the pilot always actuates the roll control lever in a definite manner relative to the yaw control lever and although the general technique is the same, the proportion of roll control lever deflection to yaw control lever deflection is different for the many different flight conditions.

The second of these two opposite techniques necessary to fully control the airplane, when incorporating the conventional three-control system, is used when the aircraft is maneuvered at or very near what is termed the stalling speed by those skilled in the art. For maneuvers involving such airspeeds, for example, as during landing, some roll elements, e. g. ailerons, have characteristics such that they either give a reversal of roll control when the roll control lever is actuated in the normal manner or other such undesirable effects are experienced.

To take care of these different circumstances when handling the conventional three-control system for maneuvering at or near stalling speeds, the pilot is trained to hold the roll control lever at no deflection and to maneuver the airplane entirely by the use of the yaw control lever and pitch control lever.

Is using the conventional three-control system then, the pilot must know these two quite different techniques for performing the corresponding maneuver in each of the two speed ranges, normal flight and stall. Also, he must know the air speed of the aircraft relative to the stall speed so as to distinguish which technique to use at any particular time. In addition, since he uses the coordinated roll and yaw technique most of the time, except when just off the ground during landing, most pilots seldom stalling the airplane just for the practice, he has the habit of always actuating the roll control lever in conjunction with the yaw control lever for turning. At times when the pilot is under stress when the aircraft may become inadvertently stalled, he will, by force of habit, often actuate the roll control lever when he should not. This fact is particularly applicable to less experienced and less capable pilots. This confusion as to just which technique to use at what times has been a source of difficulty in pilot training, as well as a source of danger.

The type of control systems which have the roll and yaw elements interconnected, automatically provide properly coordinated roll and yaw element deflections over part or all of the normal flight speed range. Two arrangements for this type of control system have been devised. Those arrangements having a constant-ratio of roll to yaw element deflections avoid the difficulties which are experienced by the conventional three-control type of system at lower air speeds where the proportion of roll to yaw is incorrect, and where the second technique is required, by limiting the speed range of the airplane and by cutting off the undesirable speeds in some way such as by limiting the pitch element deflection so that the airplane cannot be trimmed at the lower speeds. Thus, both these difficulties are solved by avoiding both the lower air speeds where the constant-ratio of roll to yaw is incorrect and the even lower air speeds where, with the conventional three-control system, the second technique must be used, that is, the technique which requires the roll element to be held at zero deflection. Such limitation of speed range is, however, a serious penalty to performance. In my co-pending application (Serial No. 788,341, now Patent No. 2,611,563), an interconnected roll and yaw element arrangement is disclosed which provides proper coordination down to the stall speed. Such arrangement utilizes an additional interconnection whereby the proportion of roll to yaw is adjusted by the pitch element position. With such improvement, part of the limitation of speed range is unnecessary.

The object of this invention is to provide a simplified arrangement of control devices which automatically gives substantially the correct ratio of roll to yaw for properly banked turns at all normal air speeds by the use of a single lateral control lever and which also provides automatically the special technique needed for maneuvering in or near stall speeds by the same use of the same single lateral control lever.

Another object of the invention is to provide a single control lever by which the pilot can laterally control the aircraft by one simple technique at all airspeeds including full stall with unrestricted pitch control.

Another object of the invention is to provide a control system for airplanes which has a single primary control lever for coordinated banking and turning control at all airspeeds and for handling lateral control in the full unrestricted stall, and a single secondary control lever which provides coordinated cross-control effects for use in side slipping, glide control and cross-wind landings.

Another object of the invention is to provide a simplified control system as discussed in the previous objectives for use with special high-lift devices to provide added performance and control for the airplane.

Other objects and advantages of the invention will appear from the following description when considered in connection with the drawings forming a part of this specification, and in which:

Fig. 3 is a fragmentary approximately top plan view of the automatically adjustable linkage in the central portion of Figure 2, Figs. 4 and 5 are fragmentary views illustrating a modification of the automatically adjustable linkage.

Figure 1:
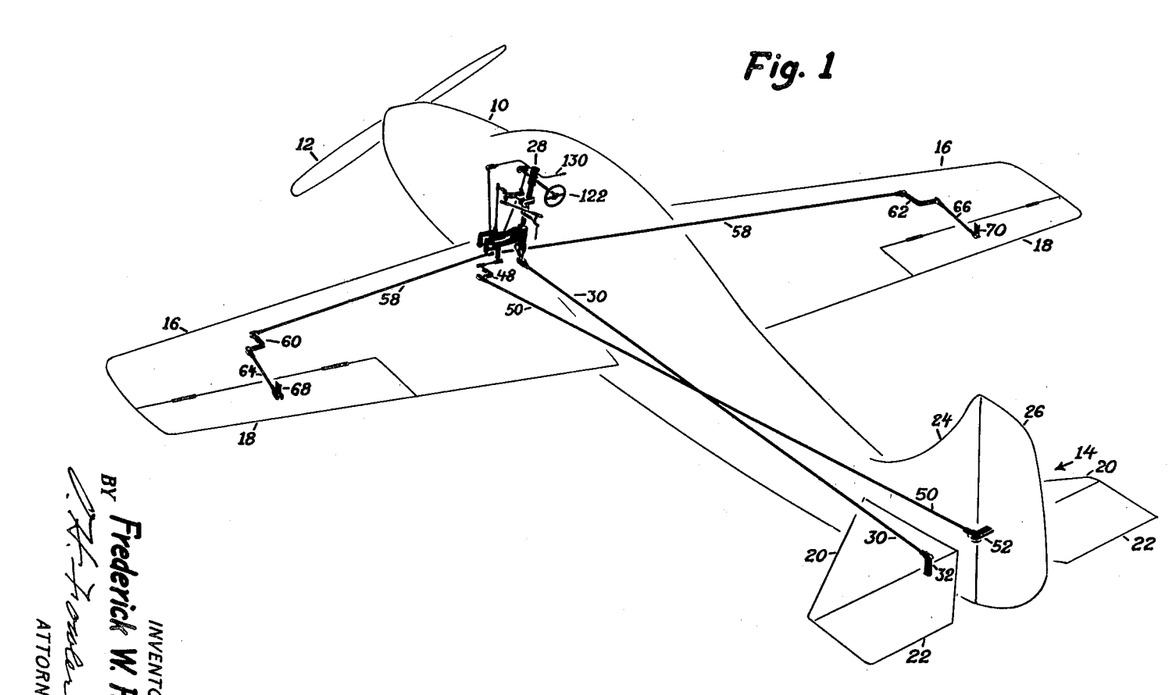
Fig. 1 is a perspective view of the airplane illustrating the control system as installed.

Referring to the drawings for more specific details of the invention, 10 represents a fuselage having suitable housing facilities for a pilot and passengers, and also suitable housing for a power plant, not shown, for driving a propeller 12. The fuselage also carries conventional empennage 14.

Oppositely disposed wings 16 of like structure are secured to the fuselage, and ailerons 18 are hinged to the trailing edges thereof and the wings support a main landing gear, not shown, preferably of the retractable type.

The empennage 14 consists of a conventional fixed horizontal stabilizer 20 with oppositely disposed corresponding elevator surfaces 22 hinged to the trailing edge thereof, and a fixed vertical fin 24 with a rudder 26 hinged to its trailing edge.

Figure 2:
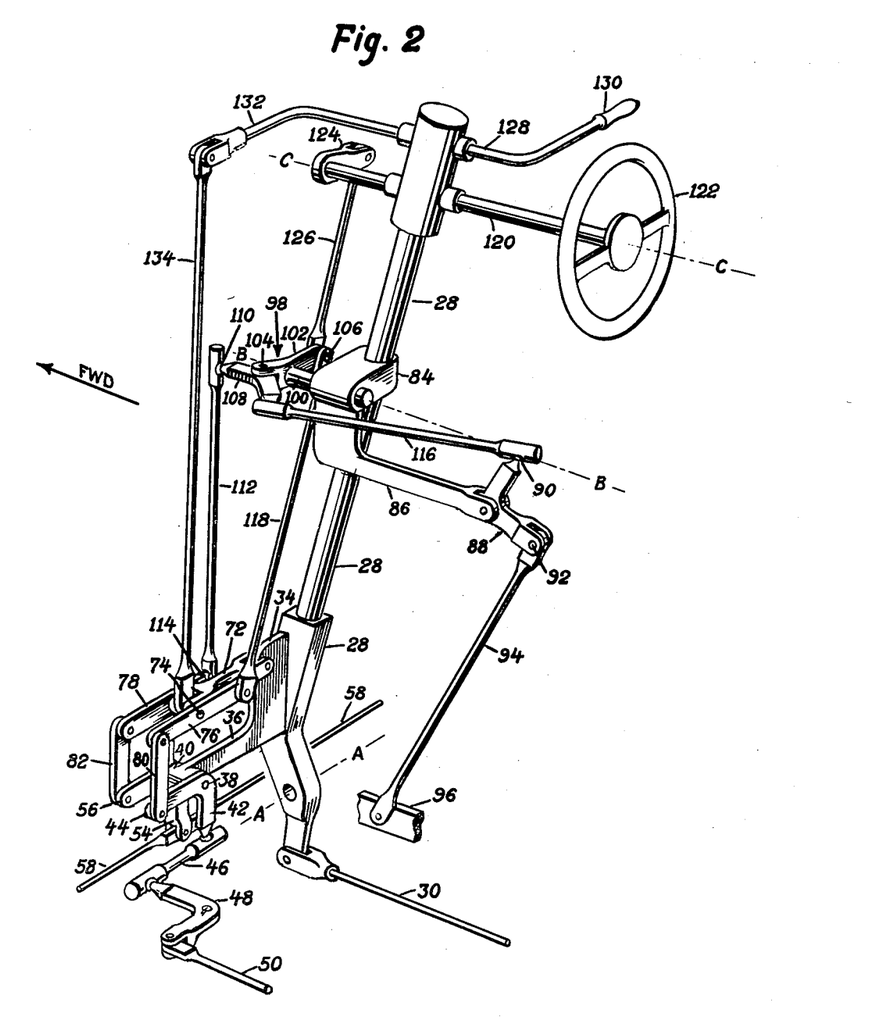
Fig. 2 is a perspective view of the control column and associated parts.

A control column or lever 28 has a pivotal axis A—A intermediate its length and transversely disposed with relation to the fuselage 10. The lower extremity of the column 28 is connected as by a rod 30 to a horn 32 fixedly secured to the elevator 22 so that the trailing edge thereof may be raised or lowered upon movement of the control column on its pivotal axis.

A bracket 34 fixedly secured to the control column above its pivotal axis and extended laterally therefrom has an arm 36 supporting corresponding bell-crank levers 38 and 40 in spaced parallel relation to one another. The bell-crank lever 38 has arms 42 and 44, the arm 42 being connected as by a link 46 to one arm of a bell-crank lever 48 fulcrumed on a fixed support and the other arm of the bell-crank lever 48 being connected as by a rod 50 to a horn 52 fixedly secured to the rudder 26 for swinging movement thereof.

The bell-crank lever 40 has arms 54 and 56 of substantially the same length, the arm 54 being connected as by rods 58 to corresponding bell-crank levers 60 and 62 fulcrumed on the wing structure in reverse relation to one another and connected as by rods 64 and 66 to horns 68 and 70 fixedly secured to the ailerons 18 for swinging movement of the ailerons.

A link 72 pivotally supported on the bracket 34 above the arm 36 has a transversely disposed pintle 74 in its free end, rocker arms 76 and 78 being supported on the pintle, one on each side of the link 72. One end of the arm 76 is connected as by a link 80 to the arm 44 of the bell crank 38 and one end of the rocker arm 78 is connected as by a link 82 to the arm 56 of the bell crank 40.

A bracket 84, fixedly secured to the control column and extended laterally therefrom, has an arm 86 fixedly secured thereto. Arm 86 is extended substantially rearward from the control column and has fulcrumed thereon a bell-crank lever 88, one arm of which terminates in a pivot 90, the purpose of which will hereinafter be disclosed, and its other arm terminates in a clevis 92 connected as by a rod 94 to a fixed support 96 on the fuselage 10 and yet it may be otherwise connected as will appear further on.

Figures 3, 4, 5:
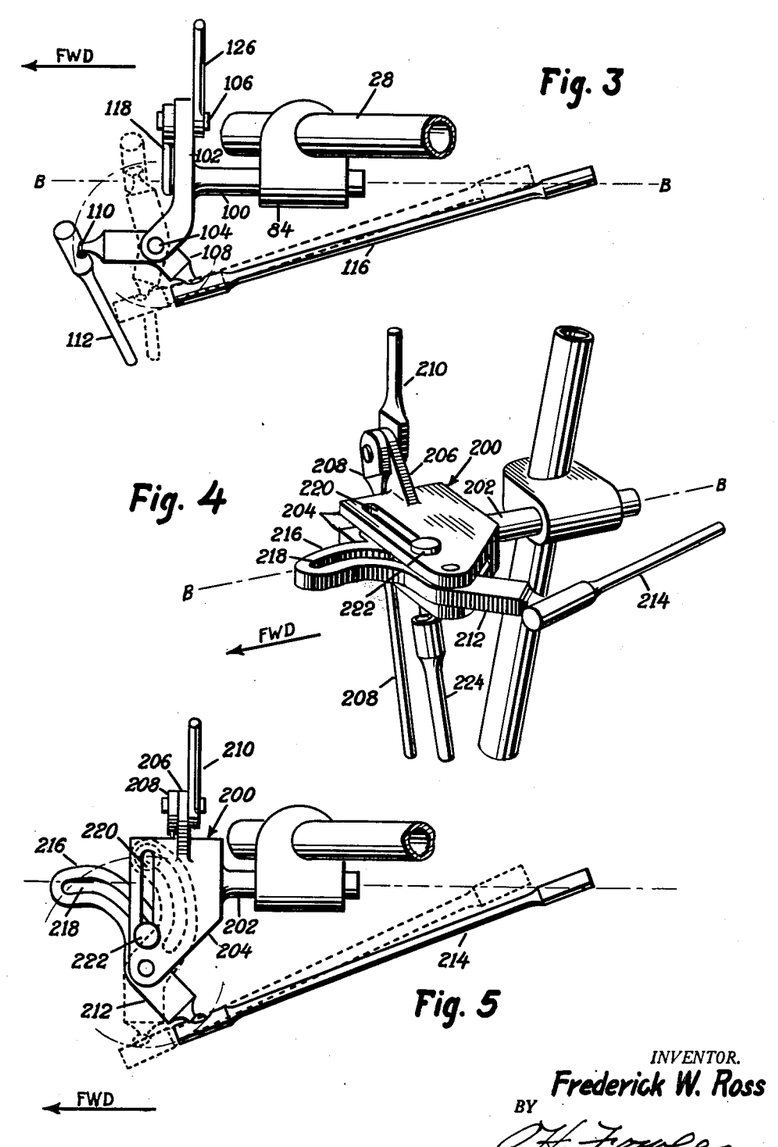

An automatically operative adjustor indicated generally at 98 is supported on the bracket 84 above the arm 86. As shown the adjustor includes a rockshaft 100 rotatable on axis B—B which coincides with axis of the pivot 90 on the bell-crank lever 88. Rockshaft 100 has fixedly secured thereto a rocker arm 102 having a clevis 104 on one end and a clevis 106 on its other end. The clevis 104 is transverse of the arm and has fulcrumed thereon a bell-crank lever 108, one arm of which is pivoted as at pivotal connection 110 to a rod 112 connected to the rocker arm 78 as at 114, and the other arm of the bell-crank lever 108 is connected as by a rod 116 to the pivot 90 on the bell-crank lever 88, and the clevis 106 on the rocker arm 102 is connected as by a rod 118 to the rocker arm 76.

A shaft 120 mounted for rotation on the column 28 on an axis C—C substantially normal to the axis of the column has thereon a primary control lever or primary control wheel 122 and an arm 124 connected as by a rod 126 to the clevis 106 on the rocker arm 102, and another shaft 128 mounted for rotation on the column above the shaft 120 and in substantially parallel relation thereto has on one end thereof a secondary control lever 130 adjacent the primary control wheel 122 and an arm 132 connected as by a rod 134 to the pintle 74 connecting the link 72 to the rocker arms 76 and 78.

It is to be observed that if either the primary control wheel 122 or the secondary control lever 130 is moved forward or backward the control column 28 rotates about its axis A—A and this in turn, through the automatically operative adjustor 98 and its connections, causes the bell-crank lever 88 to swing on its fulcrum and also the bell-crank lever 108 to swing on its fulcrum to position its pivotal connection 110 with the rod 112 at a varying radius from the axis B—B of the rockshaft 100 to which the bell-crank lever 108 is attached through the rocker arm 102.

As the control wheel 122, or the control lever 130, is moved further backward from the extreme forward position, the pivotal connection 110 of the bell-crank lever 108 to the rod 112 is positioned progressively closer to the axis B—B.

For the extreme backward positions of the control wheel, or the control lever, the pivotal connection 110 of the bell-crank lever 108 and the rod 112 is either centered on the axis B—B or has crossed over to the opposite side of the axis B—B from the side on which it was for forward positions of the control wheel or control lever. Two extreme positions of the automatically operable adjustor are shown by the solid and the dashed lines in Fig. 3.

In operation, rotation of the primary control wheel 122 rotates rockshaft 100 about its axis B—B which in turn rocks the rocker arm 102 and through its connections 112 and 118 the rocker arms 76 and 78 are rocked in opposite directions when the control column is held in the more forward positions. The rocker arm 76 is connected through link 80, bell-crank lever 38, rod 46, bell-crank lever 48, and rod 50 to the rudder 26, and the rocker arm 78 is connected through the link 82, bell-crank lever 40 and rods 58 to the ailerons 18. Accordingly the rudder and ailerons are deflected.

Rotation of the control wheel 122 clockwise, through the automatically operative adjustor 98 and associated linkages, causes the trailing edge of the aileron on the starboard side to be deflected upward and the trailing edge of the aileron on the port side to be deflected downward, and simultaneously the rudder is actuated by the push-pull rod 118 connected thereto and to the rocker arm 76, which in turn is connected through link 80, bell crank 38, link 46, bell crank 48, and rod 50 to deflect the trailing edge of the rudder to the right. These deflections are in a direction to cause the airplane to make a coordinated turn to the right. Correspondingly an opposite rotation of the control wheel 122 causes the ailerons and the rudder each to be deflected reversely so that the airplane will make a coordinated turn to the left.

The structure of the automatically operative adjustor 98, its relation to the control column 28 and its connection through the push-pull rod 116, the bell crank 88 and push-pull rod 94 to the fixed support, is such that the radial distance of its pivotal connection 110 to the push-pull rod 112 from the axis B—B is adjusted by movement of the control wheel 122 fore or aft on its pivotal axis A—A. Accordingly for forward positions of the control wheel 122 the radial distance of the coupling 110 from the axis B—B is greater and under this condition, rotation of the control wheel 122 results in a greater deflection of the ailerons, whereas, when the control wheel 122 is swung backward on the axis A—A the coupling 110 is moved closer to the axis B—B and under this condition a corresponding rotation of the control wheel 122 results in less deflection of the roll element or ailerons.

For the extreme backward position of the control wheel 122, the pivotal connection 110 is held quite close to the axis B—B and the structure may be adjusted to be held on the axis B—B or to cross over a small amount, it being understood that the particular adjustments required for any particular installation are made depending upon the particular application.

From the foregoing description, it is clear that the interconnection of the rudder is such that a particular rotation of the control wheel 122 results in a particular deflection of the rudder and that these movements are substantially independent of the forward and backward positions of the control wheel and yet it may be otherwise as will appear further on.

It is also clear that in order to perform a true-banked turn under differing conditions of flight, varying proportions of deflection of ailerons to deflections of rudder are required. Careful analysis of these requirements has shown that the proportions required are a substantially determinable relation with air speed. Inasmuch as the angle of attack for trim of the wing relative to the flight path of the airplane is a substantially definite relation to the air speed and since there is a definitely determinable relationship between such trim and the pitch element, or elevator setting, hence, there is a definitely determinable relation between the pitch element, or elevator setting and the required ratio of aileron deflections to rudder deflections.

This relationship is varied by the effects of engine power, weight and balancing of the airplane, pitch-element trim device position, and flap positions (for airplanes having flaps), for example. On the structure disclosed the pivotal connection 110 is moved radially about the axis of rotation of the bell-crank lever 108 by the forward and backward movements of the control wheel 122, and, through the automatically operative adjustor 98, provides substantially this relationship between the determinable required ratio and the elevator setting. It is, of course, to be understood that for particular applications the substantially required ratio is readily determined for the particular characteristics of the airplane to which the structure is to be applied. For applications to airplanes for which the effects of engine power, weight and balancing, the pitch-element trim device position, the flap position, and such other auxiliary controls or devices as may be incorporated on the airplane, introduce significant changes in the required ratio of roll to yaw control, the automatically operative adjustor is connected in the control system as described further on.

It is to be observed that rotation of the primary control wheel 122 results in rocking the rocker arm 102 and that the bell-crank lever 108 supported on one end of the rocker arm is coupled as by the pivotal connection 110 to the push-pull rod 112 and that the push-pull rod 118 is connected to the other end of the rocker arm. Accordingly, push-pull rods 112 and 118 will move in opposite directions. This is of importance inasmuch as the aerodynamic and friction reactions tend to resist movement of the linkage to which rods 112 and 118 are connected and the link 72, connected in the linkage, is free to swing and any large unbalance of forces would tend to make the link 72 swing on its pivotal connection with the bracket 34. However, the arrangement described wherein the rods 112 and 118 move in opposite directions, is such that these forces react against each other, hence through the linkage actuated by the push-pull rods 112 and 118, the ailerons and rudder are deflected with only the difference reactive force tending to swing the link 72. Thus, for normal applications small amounts of friction such as the natural friction of the bearings make it possible to have operation of the ailerons and the rudder with substantially positive action and yet not react through the link 72.

It is important that the primary and secondary controls 122 and 130 respectively be completely independent and that the pilot need not apply force to one control lever to hold it in position because he has actuated the other. It is to be observed that actuation of the secondary control lever 130 swings the link 72, and that the rods 112 and 118, connected to the adjacent ends of the rocker arms 78 and 76 respectively, react against each other through their connection to the rocker arm of the adjustor 98. Also, upon actuation of secondary control lever 130 about its own axis the rocker arms 76 and 78 are rocked in the same direction (rather than in opposite directions as when actuated through the control wheel 122) and this actuation of the rocker arms 76 and 78 and the linkages connected thereto results in deflecting the ailerons and rudder in a cross-control manner rather than in the manner to perform a coordinated turn. Thus, by actuation of the secondary control lever 130 the pilot may cause the airplane to sideslip as for use in glide control and cross-wind landings. The operation is positive and substantially independent of the operation of the control wheel.

In addition, the secondary control lever 130 may also be used for lateral trim so that effects causing slight deviations from a true-bank turn by use of the control wheel (as hereinbefore described) can be corrected or any effects causing unsymmetrical flight can be trimmed out during straight flight. The pilot does not have to hold his foot on the rudder control, no separate lateral trim tab need be installed, and yet the airplane can be flown correctly and accurately.

When the primary control wheel 122 is held all the way back the coupling 110 is held nearly on the axis B—B of the rockshaft 100. The coupling 110 is either held on the axis B—B or near it or is caused to cross over depending upon the particular requirements of each installation. For applications where the aileron control effects are reversed in the stall the adjustment is made to cross over; for other applications the location of the coupling 110 on axis B—B is preferable.

The rotation of primary control wheel 122 when held in backward positions causes normal rudder deflections but no aileron deflections (or a little reverse aileron deflection if the adjustment is made to cross over). This operation of controls is the second of the two techniques hereinbefore mentioned which are required for use of the conventional three-control system.

The importance of this improvement is apparent when it is noted that both the normal-flight coordinated-turn technique and the stalled flight technique are performed by one single lever (the primary control wheel 122) with one single operation (a simple rotation) rather than by two separate controls (rudder pedals and the control wheel) which must be carefully operated with two much more complicated techniques.

In the modification illustrated in Figs. 4 and 5 the automatically operative adjustor illustrated in Figs. 2 and 3 is replaced by another automatic adjustor indicated generally at 200. In this embodiment of the invention a rockshaft 202 corresponding to the rockshaft 100 of the preferred embodiment has secured thereon a bifurcated plate 204 in axial alignment with the rockshaft 202. A short arm 206 is fixedly secured to one side of plate 204. The short arm is connected to push-pull rods 208 and 210 corresponding to the push-pull rods 118 and 126 of the preferred embodiment. A bell-crank lever 212, pivotally supported between segments of the bifurcated plate 204, has one arm connected to a push-pull rod 214 corresponding to push-pull rod 116 of the preferred embodiment and the other arm carries a segment 216 having an arcuate slot 218. The two segments of the bifurcated plate 204 have registering slots 220 located in angular relation to the rockshaft 202, and a pin 222 in the slots 220 and the slot 218 of the segment 216 is connected to a push-pull rod 224 corresponding to the push-pull rod 112 of the preferred embodiment.

Figure 6:
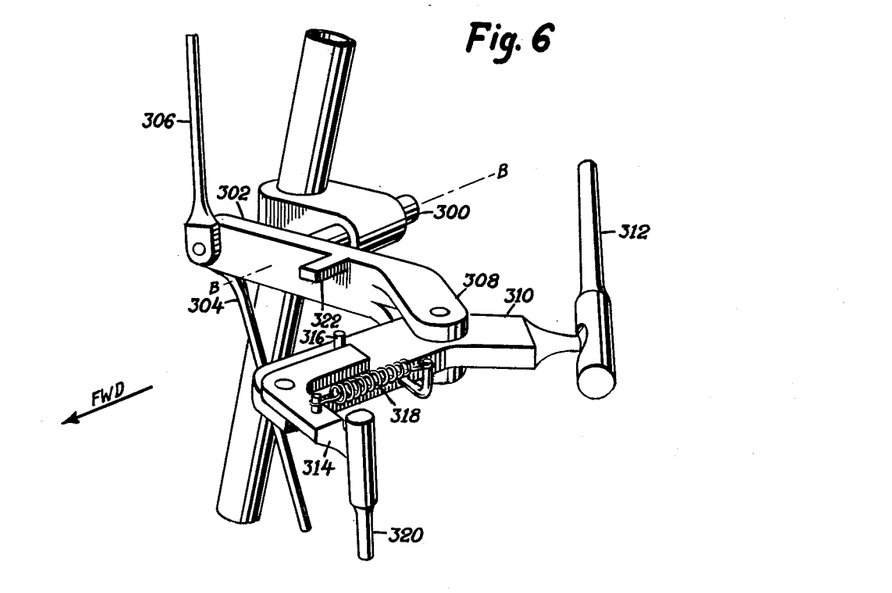
Figs. 6 and 7 are fragmentary views illustrating another modification of the automatically adjustable linkage.
Figure 7:
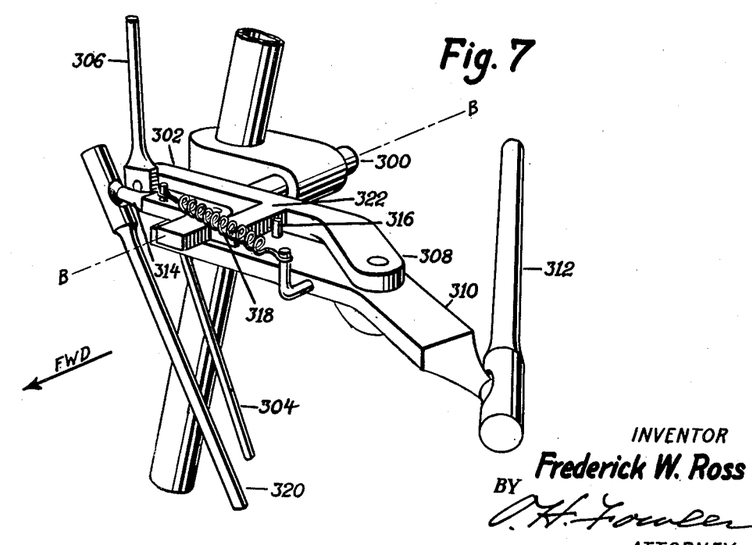

Another modification of the automatically operative adjustor is illustrated in Figs. 6 and 7. In this embodiment of the invention a rockshaft 300 corresponding to the rockshaft 100 of the preferred embodiment of the invention has secured thereon a rocker arm 302, one arm of which is connected to push-pull rods 304 and 306 corresponding to the push-pull rods 118 and 126 of the preferred embodiment and the other arm is offset as at 308 and pivotally supports a bell-crank 310, one arm of which is connected to a push-pull rod 312 corresponding to the push-pull rod 116 of the preferred embodiment, and the other arm of the bell-crank lever 310 pivotally supports a bell-crank lever 314 one arm of which is normally held against a stop 316 on the bell-crank lever 310 as by a spring 318 as shown in Fig. 6. The other arm of the bell-crank lever 314 is connected to a rod 320, and the bell-crank lever 314 is moved from its seat on the stop 316 by a boss 322 on the rocker arm 302 when the bell-crank lever 310 is swung on its pivot by forward movement of the push-pull rod 312 as shown in Fig. 7.

The structure of this embodiment is such that in the operation thereof, rotation of the bell-crank lever 310, wherein the boss 322 has no influence, the effective radius of the connection between the bell-crank lever 310 and push-pull rod 320 from the pivotal axis of the bell-crank lever 310 is constant.

Upon clockwise rotation of the lever 310 to move the bell-crank lever 314 into engagement with the boss 322 the radius of the connection between bell-crank lever 310 and push-pull rod 320 from the pivotal axis of bell-crank lever 310 is increased substantially for comparatively small angular rotations of the lever 310. For further clockwise rotation of bell-crank lever 310 the radial distance of the pivotal connection of the bell-crank lever 310 to the push-pull rod 320 from the pivotal axis of the lever 310 remains substantially at the increased radius.

With this structure greater ratios of aileron to rudder deflection can be obtained upon actuation of the control wheel for trim at airspeeds corresponding to positions of the bell-crank lever 310 wherein bell-crank lever 314 is just up to, but has not been rotated by the boss 322, than can be obtained without this additional feature, and yet with the action of the boss 322 to rotate the bell-crank lever 314 the relation of the pivotal connection between the bell-crank lever 310 and the push-pull rod 320 to the axis of the rockshaft 300 can be retained as described hereinbefore for further rotation of the bell-crank lever 310. In all other respects the operation of this embodiment is the same as in the preferred embodiment.

Figure 8:
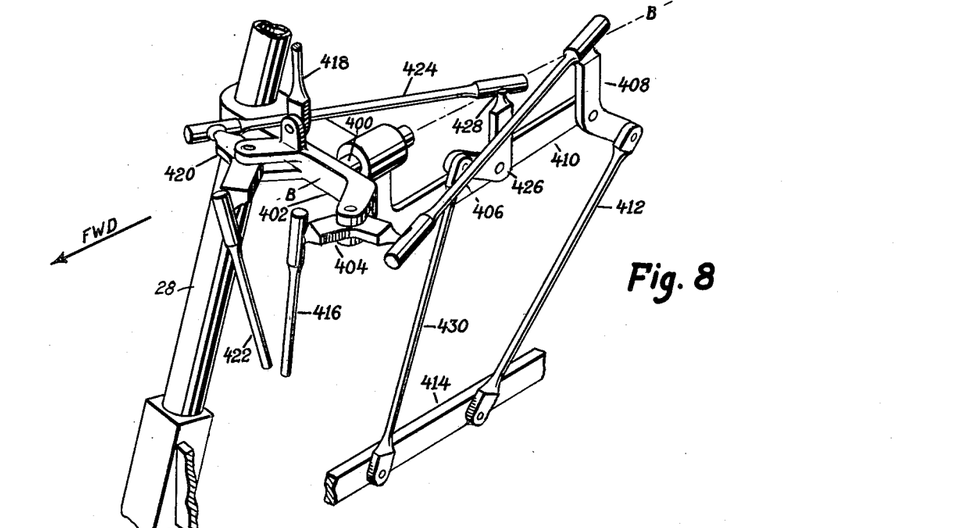
Fig. 8 is a fragmentary view in perspective illustrating a further modification of the automatically adjustable linkage.

Yet a further modification of the automatically operative adjustor is illustrated in Fig. 8. In this embodiment of the invention a rockshaft 400 has secured thereon a rocker arm 402 one arm of which has pivotally supported thereon a bell-crank lever 404, one arm of which is pivotally connected to a push-pull rod 406 corresponding to the push-pull rod 116 of the preferred embodiment. Bell-crank lever 408 pivotally supported on arm 410, push-pull rod 412 connected to bell-crank lever 408, and fixed support 414 correspond respectively to bell-crank lever 88, rod 94, and support 96 of the preferred embodiment. The other arm of the lever 404 is pivotally connected to a push-pull rod 416 corresponding to the push-pull rod 112 of the preferred embodiment, and the other arm of the rocker arm 402 is pivotally connected to a push-pull rod 418 corresponding to the push-pull rod 126 of the preferred embodiment. This arm also pivotally supports a bell-crank lever 420 one arm of which is pivotally connected to a push-pull rod 422 corresponding to push-pull rod 118 of the preferred embodiment and the other arm of bell-crank lever 420 is pivotally connected to a push-pull rod 424. Bell-crank lever 426 having pivot 428 on one of its arms is pivotally mounted on support 410 in spaced relation with rockshaft 400 to have pivot 428 located substantially on axis BB of rockshaft 400. The remaining arm of bell-crank lever 426, extended in substantially the opposite direction of the bell-crank lever 408, is connected to fixed support 414 as by rod 430.

In this embodiment of the invention forward and rearward movement of the control column results in backward and forward movement (relative to arm 402) of the pivotal connection between the bell-crank lever 404 and the push-pull rod 406 thereby varying the radius of action of rod 416 with respect to the axis of the rockshaft 400. Likewise forward and rearward movement of the control column causes forward and rearward movement (relative to arm 402) of the pivotal connection between the bell-crank lever 420 and the push-pull rod 424. This causes rotation of the bell-crank lever 420 in a sense opposite to that for the bell-crank lever 404 and thus the connection of bell-crank lever 420 to the push-pull rod 422 is positioned at a varying radius from axis B—B. Accordingly, forward or rearward positioning of the control column adjusts the proportion of aileron deflection to control wheel rotation in the same manner as for the structure of Fig. 2. Simultaneously, forward positioning of the control column, for example, provides lesser proportions of rudder deflection to control wheel rotation. And this may be adapted to have the connection of lever 420 to rod 422 cross over axis B—B and thereby provide reverse rudder deflections for use in inverted flight.

Figure 9:
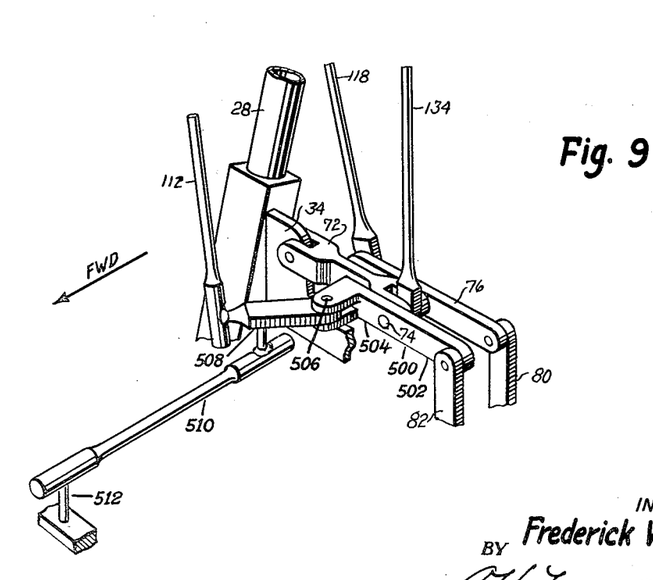
Fig. 9 is a fragmentary view illustrating a modification of the rudder-aileron override.

In modification illustrated in Fig. 9, the rocker arm 78 of the structure shown in Fig. 2 is removed and replaced by a rocker arm 500 having a long arm 502 connected to the link 82 of Fig. 2 and a relatively short arm 504 provided with a clevis 506 pivotally supporting an arm 508. The free end of the arm 508 is pivotally connected to the push-pull rod 112 of Fig. 2, and, pivotally connected to the arm 508 adjacent the free end thereof is a rod 510 pivoted on a fixed support 512. The arm 504 is foreshortened and the lever or arm 508, pivotally supported on the foreshortened arm, rotates about an axis substantially parallel to the control column.

In the operation of this embodiment because of the connection of the rod 510 to the lever 508 and the fixed support 512, forward and backward movements of the control column result in rotation of the lever 508 about its pivotal support on the foreshortened arm. Thus, when the control column is moved backwardly, as for example, the effective lever arm of push-pull rod 112 (of Fig. 2) about the axis of movable lever 500 is reduced. Hence, through the linkage as hereinbefore described, actuation of control lever 130, with this modification, causes what is termed cross-control operation of the roll and yaw elements with greater proportions of roll element deflections to yaw element deflections for positions of the control column further aft.

The greater amount of roll control needed to overcome the increased effects of roll due to yawing induced at the higher angles of attack can accordingly be more accurately handled by this structure. Such a structure provides more precision of control for the control system of airplanes where the change in the effects of roll due to yawing with angle of attack are large.

Figures 10, 11:
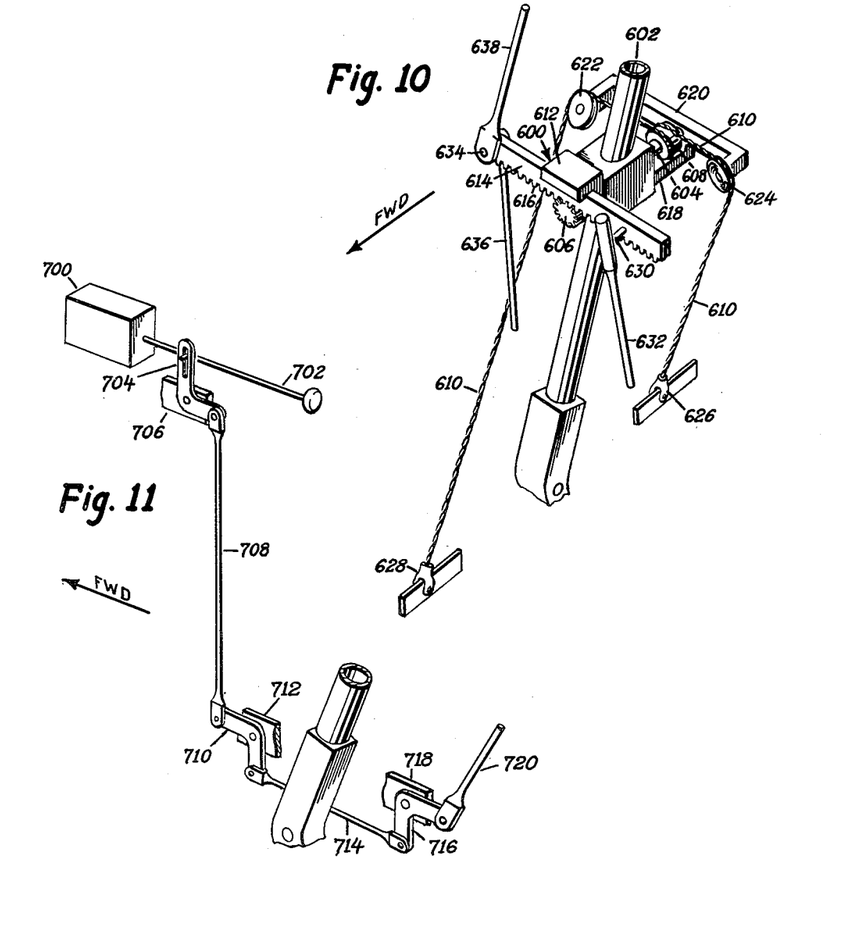
Fig. 10 is a fragmentary view in perspective illustrating still another modification of the automatic adjustor.
Fig. 11 is a diagrammatical illustration of the system as connected in an engine control system.

A further modification of the automatically operative adjustor is illustrated in Fig. 10. In this embodiment of the invention, the adjustor indicated generally at 600, includes a pivotally supported column 602 corresponding to the column 28 of the preferred embodiment. A rotatable shaft 604, pivotally mounted on the column with its axis in substantially a longitudinal relation to the airplane and having a pinion gear 606 securely mounted on its forward end and a spindle 608 for receiving cable 610 wound around spindle 608 fixedly secured on the aft end of the shaft 604, serves as a pivotal support for a rockable guiding-frame 612 aft of the pinion 606. A slideable rocker 614 is substituted for the rocker arm 102 of the preferred embodiment. The rocker 614 has a rack gear 616 on its lower side and is held in cooperation with the pinion gear 606 by the rockable guiding-frame 612. Support 618 securedly mounted to the control column 602 supports cross member 620 which in turn supports sheaves 622 and 624 in spaced relation to receive cable 610 which extends substantially laterally from each side of spindle 608. Brackets 626 and 628 are fixedly secured to the fuselage substantially in a line at right angles to the axis of rotation of the column and receive the two ends of cable 610.

A lug 630 on one end of the rocker 614 is pivotally connected to a push-pull rod 632 corresponding to push-pull rod 112 of the preferred embodiment, and a pin 634 on the other end of the rocker 614 has pivotally connected thereto push-pull rods 636 and 638 corresponding to push-pull rods 118 and 126 of the preferred embodiment.

Forward and backward movement of the control column causes relative movement of the cable laterally with respect to the column. This rotates the spindle 608, the shaft 604, and hence the pinion 606 resulting in movement of the rocker 614 either to the left or to the right, respectively, relative to the column.

In operation, rearward movement of the column through the medium of the cable and the rack and pinion assembly, the rocker 614 may be moved to the right and thus decrease the effective radius of the centerline of the rod 632 about the shaft 604. In the structure shown this radius which is effective in causing longitudinal motions of the rod 632 upon rocking of the rocker 614 about the pinion 606 can be reduced to zero and even reversed to give opposite motions to the rod 632.

The rocker 614 may be rocked about the pinion 606 by the rod 638 which in turn is caused to move by rotation of the control wheel as in the preferred embodiment.

The structure shown in Fig. 2 and also the structures illustrative of the various modifications of the automatically operative adjuster may be interconnected with the controls of the power plant. As shown in Fig. 11, a power plant 700 has a conventional throttle lever 702 pivotally connected to one arm of a bell-crank lever 704 mounted on a fixed support 706 and the other arm of the bell-crank lever 704 is connected as by a push-pull rod 708 to one arm of a bell-crank lever 710 also mounted on a fixed support 712 and having its other arm connected as by a push-pull rod 714 to one arm of yet another bell-crank lever 716 mounted on a fixed support 718 and having its other arm connected to a rod 720 corresponding to the push-pull rod 94 of the preferred embodiment.

In this structure forward movement of the throttle 702 results in longitudinal movement of the rod 720 thus causing a readjustment of the ratio of deflection of roll element to yaw element through the linkage described in connection with the preferred embodiment. The linkage for connecting the throttle 702 to the push-pull rod 720 may be varied. In some instances it may be desirable to have a reverse motion of the push-pull rod relative to that of the throttle.

The structure shown in Fig. 1 may be modified to include use of special high-lift devices and devices for increasing the drag of the airplane for glide-angle control. The structure shown in Fig. 2 and also the structures illustrative of the various modifications described hereinbefore may be interconnected with the operating levers for operating such special high-lift or high-drag devices. As an example (Figure 12), an airplane indicated generally at 800 has a fuselage 802 and wings 804 having ailerons 806 and partial-span trailing-edge flaps 808.

Figure 12:
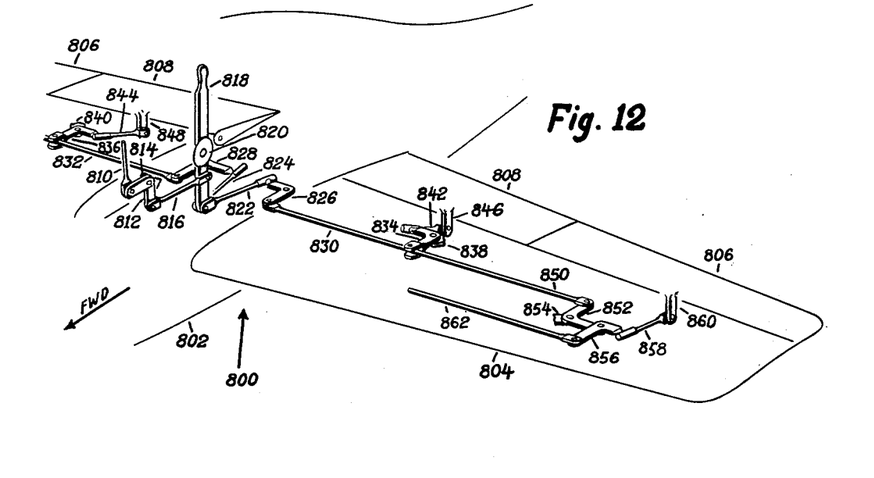
Fig. 12 is a perspective view illustrating a modification of the control system as applied to a wing with flaps.

A push-pull rod 810 corresponding to the push-pull rod 94 of the preferred embodiment is connected to one arm of a bell-crank lever 812 mounted on a fixed support 814 and having its other arm connected as by a push-pull rod 816 to a hand lever 818 fulcrumed intermediate its two ends and having a means such as the friction plate 820 to hold it in position. The lever 818 is connected as by links 822 and 824 to oppositely arranged bell-crank levers 826 and 828 pivoted on fixed supports and connected in turn by push-pull rods 830 and 832 to oppositely disposed bell-crank levers 834 and 836 mounted on fixed supports 838 and 840 on the wing structure.

Bell-crank levers 834 and 836 are connected as by rods 842 and 844 to horns 846 and 848 fixedly secured to oppositely disposed flaps 808. Push-pull rod 850, pivotally connected to the outboard end of rod 830, extends outboard and is connected to the substantially rearward extending arm of bell-crank lever 852 which is pivotally mounted on fixed support 854 on the wing structure. Bell-crank lever 856, pivoted on the other arm of bell-crank lever 852, has one of its arms connected by push-pull rod 858 to horn 860 secured to the port side aileron 806. The other leg of bell-crank lever 856 is connected to push-pull rod 862 corresponding to push-pull rod 58 of Fig. 1. Oppositely disposed structure similarly connects the outboard end of rod 832 to the starboard side aileron 806.

Actuation of the hand lever 818 adjusts the position of push-pull rod 810 to eliminate any effects of change, particularly in fore or aft position of the control column, introduced by changes in pitching moment caused by deflection of the flaps by the actuation of the hand lever 818.

The structure disclosed in Fig. 12 illustrates what is termed by those skilled in the art as partial-span inboard flaps with drooping ailerons. Movement of hand lever 818 to the rear, through the structure as described lowers the trailing edges of both of the flaps 808 and both ailerons 806 as in a flap-type deflection. Longitudinal motion of rod 862 and corresponding oppositely disposed rod for the starboard side aileron by the actuation of control wheel 122 or control lever 130 will cause oppositely disposed ailerons 806 to be deflected differentially in the usual manner as ailerons as described hereinbefore.

An arrangement using what is termed by those skilled in the art as full-span trailing-edge flaps may be obtained by eliminating bell-crank lever 834 and 836, rods 842 and 844, horns 846 and 848, by rigidly connecting rods 830 and 832 to rods 850 and corresponding oppositely disposed rod for the starboard side aileron respectively, by eliminating flaps 808, and by extending ailerons 806 along the entire span of the trailing edge of the wing for utilization as flap-ailerons. The necessary modification for use of partial-span flaps without drooping ailerons can be readily made by anyone skilled in the art.

The important advantage gained by the use of either partial-span flaps with drooping ailerons or of full-span flap-ailerons in conjunction with the control system as described hereinbefore is apparent when it is observed that one of the handicaps to the use of full-span flaps (or partial-span flaps with drooping ailerons) is the lateral control problem at or near the stalling speed for the wing. For these airspeeds, with the conventional control arrangement, when the flaps are lowered fully to obtain the highest lift, inadequate travel is left to provide aileron or roll control. On the other hand when the flaps are lowered a lesser amount to allow adequate roll control, then the full benefit of the increased lift is lost. With the structures as disclosed herein since under these conditions of airspeed the aileron travel is decreased to zero then this difficulty is removed and the full-span flaps (or partial-span flaps with drooping ailerons) can be utilized to obtain the highest lift and yet have the full lateral control required.

The structure of the airplane shown in Fig. 1 may be modified to include some type of longitudinal or pitch element trimming device to reduce the control forces on the pitch control lever such as may be introduced by change in the airplane balance or center of gravity position, the airspeed, the maneuvering flight path of the airplane or by the propeller slip stream effects over the horizontal tail surfaces. Such devices include an adjustable horizontal stabilizer or elevator trim tab.

Figure 13:
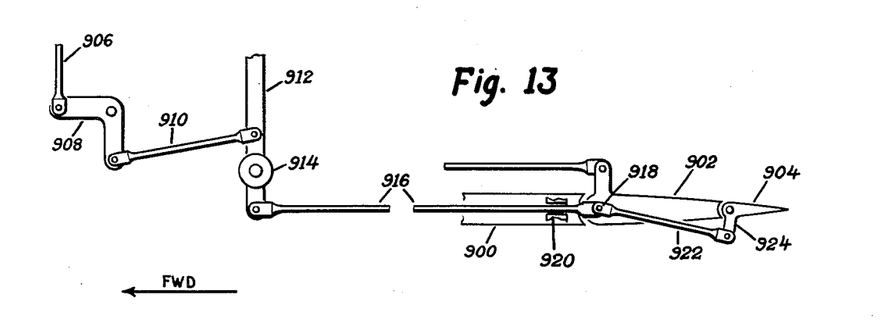
Fig. 13 is a diagrammatical illustration of the system as connected in a pitch-element trimming system.

Application of the control system described hereinbefore to airplanes for which the effects of incorporation of such pitch element trimming devices are large may necessitate modification. Such a modification is illustrated in Fig. 13 where the fixed horizontal stabilizer 900 and the movable elevator 902 correspond respectively to horizontal stabilizer 20 and movable elevator 22 of Figs. 1 and 2 as described hereinbefore.

The elevator 902 has an adjustable trim tab 904 hinged to its trailing edge. Push-pull rod 906, which corresponds to rod 94 of Fig. 2 is pivotally connected to one arm of bell-crank lever 908 which is pivotally supported on the fuselage frame. The other arm of bell-crank lever 908 is connected as by push-pull rod 910 to tab-adjusting lever 912 which is pivoted intermediate its two ends as on friction bearing 914. Push-pull rod 916 which connects pivot 918 to tab lever 912 is of suitable length and is supported for free longitudinal motion by support 920 so that pivot 918 is located substantially at the axis of rotation of elevator 902. Pivot 918 is connected as by push-pull rod 922 to horn 924 fixedly secured to tab 904.

This structure is operative in the following manner. Movement of tab lever 912 through the linkage as shown causes deflection of tab 904. The tab lever 912 and the tab are held in a set position by the friction bearing 914. Movement of tab lever 912 through rod 910 and bell-crank lever 908 also causes longitudinal motion of rod 906. This, in turn, through the linkage as described hereinbefore and illustrated as in Fig. 2, readjusts the ratio of roll to yaw element deflection obtained from rotation of the control wheel about its own axis, to substantially eliminate any changes introduced by the trim tab deflections in the relation between the elevator or pitch element setting and the required ratio of roll to yaw element deflection for substantially true-banked turning by use of the control wheel only as discussed hereinbefore.

By pre-setting the tab lever to predetermined positions corresponding to pitch trim-tab positioning for uniform flight at various balance conditions for the airplane, the structure as described will automatically adjust the ratio of roll to yaw element deflections to take care of large center of gravity changes.

The control system described can be readily adapted to incorporate independently operative interconnections to more than one of the auxiliary controls such as engine throttle, flaps, or pitch element trim device.

In summary, this invention is an interconnected roll-yaw control system incorporating an entirely new principle for the interconnection. This interconnection includes an automatic adjustor operated primarily, through suitable means, by the positioning of the pitch element and secondarily, through suitable auxiliary means, by the positioning of auxiliary flight or engine controls including pitch element trimming device, flaps, or engine throttle. This automatically adjustable interconnection, thus, provides a control system substantially capable of handling automatically the determinable relations of roll and yaw element deflections required (as disclosed hereinbefore) which are characteristic of the aerodynamic flow over an airplane wing having a roll element mounted thereon, and hence, with this control system accurately coordinated turns can be made, without restriction to performance or control element deflections, by merely operating one lever and without attention by the pilot to airspeed, center of gravity position, flap position, or any such auxiliary engine or flight controls.

In particular it is disclosed that the feature wherein the roll element deflection is reduced to zero for lateral control in the stall attitude introduces a new technique permitting the use of special high lift devices for improved performance of airplanes.

This interconnected roll-yaw control system, as incorporated with the secondary control lever and suitable means as described for providing a double over-riding cross-control means incorporating both roll and yaw element deflecting means, provides a control system capable of unrestricted control yet requiring much simpler pilot technique.

While this invention has been described in connection with certain embodiments, the principles disclosed involve particular relations of a number of components and are susceptible of numerous other applications involving other means mechanical, electrical, or hydraulic, that will readily occur to persons skilled in the art. The invention is therefore, to be limited only as indicated by the scope of the appended claims.

Having thus described the various features of the invention, what I claim as new and desire to secure by Letters Patent is:

1. In an airplane control system, a pivotally supported swinging controller, a pitch element linked thereto, a rockable member pivotally connected at a rocking axis to the controller, a yaw element linked to the rockable member, a lever pivoted on the rockable member at a pivot point spaced away from the rocking axis of said rockable member, a roll element linked to the lever, means responsive to the swinging of said controller for moving the lever proportionately to movement of the controller and means for moving the rockable member.

2. In an airplane control system, a pivotally supported swinging controller, a pitch element linked thereto, a rockable member pivotally connected at a rocking axis to the controller, a yaw element linked to the rockable member, a pivotally supported member pivoted on the rockable member at a pivot point spaced away from the rocking axis of said rockable member, a roll element connected thereto, and means responsive to the swinging of said controller for swinging the pivotally supported member effective to vary the relation of the connection with relation to the axis of the rockable member proportionate to movement of the controller.

3. In an airplane control system, a pivotally supported swinging controller, a pitch element linked thereto, a rockable member pivotally connected at a rocking axis to the controller, a yaw element linked to said rockable member, a swinging member pivotally supported on the rockable member at a pivot point spaced away from the rocking axis of said rockable member, roll elements connected thereto, means responsive to the swinging of said controller for swinging the pivotally supported member proportionately to swinging movements of the controller so as to vary the connection of the roll element with relation to the axis of the rockable member, and means on the controller for swinging the rockable member.

4. In an airplane control system, a pivoted swinging controller, a pitch element connected thereto, a rocker arm connected at a rocking axis to the controller, a yaw element connected to one end of the rocker arm, a lever pivoted on the other end of the rocker arm at a pivot point spaced away from the rocking axis of said rocker arm, a roll element connected to one end of the lever, means connected to the other end of the lever effective to vary the angular position thereof proportionately to variations in the position of the controller and means on the controller for turning the rocker arm.

5. In an airplane control system, a pivotally supported swinging controller, a pitch element linked thereto, a rocker arm connected at a rocking axis to the controller, a yaw element connected through linkage to the rocker arm, a lever pivotally supported on the rocker arm at a pivot point spaced away from the rocking axis of said rocker arm, a roll element connected through linkage to the lever, means connected to the lever effective to swing the lever upon movement of the controller so as to vary the relation of the roll element connection to the axis of the rocker arm proportionately to movement of the controller, a control on the controller for swinging the rocker arm, and an auxiliary control on the controller interconnecting said linkages of the yaw and roll elements.

6. In an airplane control system, a pivotally-supported swinging controller, a pitch element linked thereto, a rockable member pivotally connected at a rocking axis to the controller, a yaw element linked to the rockable member, a lever pivoted on the rockable member at a pivot point spaced away from the rocking axis of said rockable member, a roll element linked to the lever, means responsive to the swinging of said controller for moving the lever proportionately to movement of the controller, and means for moving the rockable member, said rockable member including a plate having a guide slot substantially normal to the axis of said rockable member, said lever having an arcuate cam slot registering with said guide slot, and the linked connection of said roll element to said lever including a follower element simultaneously engaging said cam slot and said guide slot.

7. In an airplane control system, a pivotally-supported swinging controller, a pitch element linked thereto, a rockable member pivotally connected at a rocking axis to the controller, a yaw element linked to the rockable member, a lever pivoted on the rockable member at a pivot point spaced away from the rocking axis of said rockable member, a spring-pressed lever on one end of said previously-mentioned lever, a roll element linked to the spring-pressed lever, means on said rockable member for rotating said spring-pressed lever, means responsive to the swinging of said controller for moving the lever proportionately to movement of the controller, and means for moving the rockable member.

8. In an airplane control system, a pivotally-supported swinging controller, a pitch element linked thereto, a rockable member pivotally connected at a rocking axis to the controller, a lever pivoted on each end of the rockable member at a pivot point spaced away from the rocking axis of said rockable member, a yaw element linked to one of said levers, a roll element linked to the other of said levers, means responsive to the swinging of said controller for moving the levers proportionately to movement of the controller, and means for moving the rockable member.

9. In a control system for an airplane having roll, yaw and pitch elements, a primary control member, a secondary control member, means including a first differential mechanism for operatively connecting said primary control member to said roll element for actuation of said roll element, means including a second differential mechanism for operatively connecting said primary control member to said yaw element for actuation of said yaw element simultaneously with said roll element, whereby the operation of said primary control member actuates said roll element and said yaw element for a coordinated turn; means including said first differential mechanism for operatively connecting said secondary control member to said roll element for actuation of said roll element oppositely to and independently of said primary control member actuation of said roll element, and means including said second differential mechanism for operatively connecting said secondary control member to said yaw element for actuation of said yaw element similarly to and independently of said primary control member actuation of said yaw element, whereby operation of said secondary control member actuates said roll element and said yaw element for a cross control maneuver.

10. In an airplane control system, a support, a pivotally-supported swinging controller structure mounted on said support, a pitch element connected to said controller structure, a pair of controls on the controller structure, one of said controls interrelatedly regulating yaw and roll, the other control overriding said interrelated regulating of yaw and roll, an adjustor supported on the controller structure, a link pivoted to the controller structure and connected to one of the controls, a pair of rocker arms pivotally mounted on the link, means connecting the rocker arms through the adjustor to the other control, corresponding levers pivoted on the controller structure, links connecting the levers to the rocker arms, a roll element connected to one of the levers, and a yaw element connected through linkage to the other lever.

11. In an airplane control system, a pivotally-supported swinging controller structure, a pitch element connected to said controller structure, a pair of controls supported on the controller structure, one of said controls interrelatedly regulating yaw and roll, the other control overriding said interrelated regulating of yaw and roll, an adjustor supported on the controller structure, a link pivoted on the controller structure and connected to one of the controls, a pair of rocker arms pivotally mounted on the link, means connecting the rocker arms through the adjustor to the other control, a yaw element connected through linkage to one of the rocker arms, and a roll element connected through linkage to the other rocker arm.

12. In an airplane control system, a pivotally-supported swinging control structure, a pitch element connected to said controller structure, a pair of controls on the controller structure, one of said controls interrelatedly regulating yaw and roll, the other control overriding said interrelated regulating of yaw and roll, an adjustor supported on the controller structure, a link pivoted on the controller structure and connected to one of the controls, a pair of rocker arms pivotally mounted on the link, means connecting one of the rocker arms to the adjustor, a lever pivoted to the other rocker arm, means connecting the lever to an anchorage on the airplane for restraining movement of the lever in response to the swinging of said controller structure around its pivot, means connecting the lever to the adjustor, means connecting the adjustor to the other control, a yaw element connected through linkage to one of the rocker arms, and a roll element connected through linkage to the other rocker arm.

References Cited in the file of this patent
UNITED STATES PATENTS

| Number | Name | Date |
|---|---|---|
| 1,024,941 | Lambert | Apr. 30, 1912 |
| 1,120,957 | Mayer | Dec. 15, 1914 |
| 1,376,740 | Bolas | May 3, 1921 |
| 1,830,429 | Elsby, Jr. | Nov. 3, 1931 |
| 1,832,159 | Vanderlip | Nov. 17, 1931 |
| 2,228,311 | Gwinn, Jr. | Jan. 14, 1941 |
| 2,398,601 | Seifert | Apr. 16, 1946 |
| 2,478,033 | Weick | Aug. 2, 1949 |